3,698,927
FOAM STRUCTURE WITH PROTECTIVE
OVERCOAT
John M. Sawyer, Cuyahoga Falls, Ohio, assignor to The Goodyear Tire & Rubber Company, Akron, Ohio
No Drawing. Filed Oct. 28, 1970, Ser. No. 84,869
Int. Cl. B32b 27/40
U.S. Cl. 117—33.3                                7 Claims

ABSTRACT OF THE DISCLOSURE

A composite structure comprising a foam substrate having an adherent overcoat wherein the overcoat is an essentially non-cellular cured polyurethane epoxy-containing composition, substantially opaque to ultraviolet light. The invention has particular utility for the preparation of building structures, such as roofs of buildings, which are exposed to ultraviolet light from sunlight and particularly to the destructive coaction of moisture and ultraviolet light.

---

This invention relates to a composite structure and to a method for its preparation. It more particularly relates to a polymeric foam structure having an adherent protective cured polyurethane composition overcoat.

Plastic foams having a flexible or rigid closed cellular structure are generally suitable for many uses which, however, require exposure to moisture and the ultraviolet light from sunlight. For example, foams have been formed in place to provide low cost building structures, such as walls and roofs of buildings exposed to these degradative elements. Polyurethane foams, particularly the closed cell rigid foams, may be used for such building structures and are usually applied by spraying, foaming and curing a polyurethane reaction mixture in place or in situ on a supporting surface. However, the polyurethane foams, particularly those of polyether polyurethanes, can degrade from the exposure to moisture and the co-action of moisture with heat and with the ultraviolet light from sunlight.

Therefore, it is an object of this invention to provide a composite structure comprising a foam substrate having a protective overcoat which inhibits or retards the deterioration of the form substrate.

In accordance with this invention, it has been discovered that a new and useful composite structure comprises a polymeric cellular foam substrate, either flexible or rigid and preferably rigid to provide structural load bearing stability, having an adherent overcoat substantially opaque to ultraviolet light of an essentially non-cellular cured polyurethane coating composition, the said coating composition prepared by the method which comprises reacting in the presence of an epoxy resin at least one curative selected from diamines having primary amino groups and from at least one hydroxyl terminated hydrocarbon having from 2 to 6 carbon atoms, preferably a diol, and the mixture or product of an organic polyisocyanate and a reactive hydrogen-containing polymeric material having a molecular weight in the range of from about 700 to about 5000, where the ratio of the isocyanato groups of the polyisocyanate to the reactive hydrogens of the reactive hydrogen-containing polymeric materials is from about 1.1/1 to about 3.5/1, the ratio of amino groups and hydroxyl groups of the curative to isocyanato groups in excess of the reactive hydrogens of the reactive hydrogen-containing polymeric material is from about 0.5/1 to about 1.1/1 and where the said polyurethane composition contains from about 1 to about 15 weight percent and preferably from about 2 to about 5 weight percent of the epoxy resin, and at least sufficient to give an excess of epoxide groups relative to the total excess of the said amino groups and hydroxyl groups of the curative over the said excess isocyanato groups.

Thus, an excess of epoxide groups is required over the excess amino and/or hydroxyl groups of the curative, such as at least about 5 to about 50 equivalent percent excess, based on two epoxy groups per amino ($-NH_2$) group, to provide a polyurethane composition containing sufficient free epoxide groups.

The opaque-epoxy resin containing polyurethane overcoat used in the preparation of the composite structure of this invention inhibits or retards degradation of the foam sub-structure when the composite is exposed to moisture and particularly the co-action of moisture, heat and ultraviolet light. Building structures are commonly exposed to moisture in combination with ultraviolet light and heat, such as temperatures of from about 30° C. to about 50° C. In order to provide protection from the ultraviolet rays of sunlight, it is usually desired that the polyurethane overcoat is opaque to ultraviolet light in addition to containing the epoxy resin. To provide such an opaque overcoat, usually it is preferred that the overcoat transmits less than about 10 percent and preferably less than about 5 percent of light having a wave length of from about 2000 to about 3500 angstrom units. Thus, it is preferred that the overcoat has a thickness of at least about 5 and preferably about 5 to about 20 mils, although it can be thicker, and contains a masking amount of at least one coloring agent, such as the various dyes and pigments, to render the overcoat opaque to the ultraviolet light. Typically, the ultraviolet light is rendered opaque by absorption, actual blocking or by providing an overcoat with a proper refractive index. Complementary colors to ultraviolet, such as yellow or amber, tend to absorb the light while a strong white or dark color, such as black, tend to block it.

It is a preferred feature of this invention that the polyurethane coating be applied as a liquid reaction mixture to a freshly prepared polyurethane closed cell foam, particularly a polyether polyurethane foam. Thus, the composite structure of this invention can be prepared by the method which comprises (a) applying a liquid foamable polyurethane reaction mixture to a support surface or building form, (b) foaming, drying, and curing the foamable reaction mixture until it is a substantially dried and cured closed cell foam, preferably a rigid foam, and (c) applying an overcoat, preferably substantially immediately by spray coating the hereinbefore described epoxy-containing liquid polyurethane reaction mixture over the freshly prepared polyurethane foam and curing the said polyurethane overcoat. By "substantially immediately" it is intended that the overcoat be applied within about 6 hours after foaming, drying and curing the said foamable reaction mixture, although it can usually be successfully applied within about 50 to about 100 hours. This is primarily to provide protection before appreciable deterioration of the foam occurs.

Polymeric cellular foams of various polymeric materials can be used as the substrate in the practice of this invention although freshly prepared polyurethane foams, particularly poly ether polyurethane foams, are preferred. Examples of such materials are the polyurethanes, polystyrene, polycarbonate and rubbery materials selected from natural rubber and synthetic rubber, such as the butadiene-styrene and butadiene-isoprene synthetic rubbers. It is preferred that the cellular foam substrate is rigid and closed celled when it is used as a load bearing structure, such as for building structures including roofs of builidngs. Polyurethane foams are preferred since they can be foamed in place and thereby formed from a liquid reaction mixture in situ on a suitable building form or supporting surface, such as a roofing support, and thereby made ready for the polyurethane protective overcoat.

The polyurethane reaction mixtures used in this invention for the coating composition and for the foam are typically liquid mixtures commonly used to prepare polyurethanes, and particularly flexible polyurethanes, by the well-known 1-shot, prepolymer or semi-prepolymer techniques. The materials are typically reacted at temperatures from about 10° C. to about 150° C. and usually from about 20° C. to about 100° C.

Generally, the polyurethane reaction mixtures used in this invention for the foam substrate and the overcoat are prepared from at least one reactive hydrogen containing polymeric material as determined by the Zerewitinoff method, at least one organic polyisocyanate and curative, the epoxy resin being used with the overcoat. It is to be understood that the polyurethanes referred to in this specification may also contain polyurea linkages. A solvent can be used with the reaction mixture to facilitate its use in the form of a fluid mixture or solution although it is preferred to use the reaction mixture with only a minor amount of solvent, if any. If solvent is used, it can be added to form a mixture containing from about 40 to about 95 percent solids. However, a higher or lower concentration of solids can be used. When the solids concentration is low, the individual applications will deposit a thin layer of the polyurethane polymer, and a large amount of the solvent will have to be removed during the curing process. A solids concentration of 45 percent or higher is generally desired, if a solvent is used.

Other methods known to those skilled in the art of preparing polyurethane reaction mixtures with or without solvents being present may also be used.

A catalyst or accelerator can be used to facilitate the reaction which results in substantially reduced set-up time, and thus enhances the thixotropic properties of the polyurethane mixture. Well-known polyurethane catalysts are useful for this purpose such as tertiary amines and the tin salts of fatty acids and also accelerators such as mercaptobenzothiazole.

The foamable polyurethane reaction mixture can contain water or various well-known inert fluid-expanding or blowing agents to cause the said reaction mixture to foam. It is usually desired that the inert fluid-expanding agents be gaseous at room temperature or about 25° C. The term "inert" means that the expanding agent does not detrimentally react with the reaction mixture.

Representative examples of various blowing agents include air, nitrogen, carbon dioxide and halogenated hydro carbons, exemplary of which are methylene chloride, trichloromonofluoromethane, dichlorodifluoromethane and 1,2-dichlorotetrafluoroethane.

The foamable polyurethane reaction mixture can be used to form rigid and flexible foams, preferably rigid foams. For example, by using polymeric reactive hydrogen containing compounds having relatively low molecular weights (hydroxyl numbers of from about 350 to about 600) rigid foams can be prepared and by using such compounds having relatively high molecular weights (hydroxyl numbers of from about 30 to about 120) flexible foams can be prepared. The density of the prepared foam is dependent somewhat upon the type and amount of fluid expanding agent used.

The reactive hydrogen-containing polymeric material used to prepare the prepolymers and reaction mixtures typically comprises at least one member selected from the group consisting of polyester polyols, polyether polyols, castor oil and hydroxyl terminated unsaturated polymeric polyols. The hydroxyl terminated unsaturated polymeric polyols typically have a molecular weight of from about 2000 to about 4000 and a hydroxyl functionality of from about 2.1 to about 2.8. The reactive hydrogen-containing material generally used, other than the hydroxyl terminated unsaturated polymeric polyol, has a molecular weight in the range of from about 700 to about 5000, and usually from about 1000 to about 3000. Generally, the polyester polyols are the preferred active hydrogen-containing material for the polyurethane overcoat and the polyether polyols are preferred for the polyurethane foam substrate.

Representative examples of polyester polyols are the condensation products of low molecular weight polyols with an organic polycarboxylic acid or anhydride. Representative low molecular weight polyols are glycols such as ethylene glycol, propylene glycol, butylene glycol, pentylene glycol, decamethylene glycol, etc. Representative examples of the organic dicarboxylic acids that can be used are succinic acid, glutaric acid, adipic acid, phthalic acid, terphthalic acid, isophthalic acid, suberic acid, sebacic acid, pimelic acid, and azelaic acid. The anhydrides of such acids can be used in place of the acid. If desired, from about one to 20 percent by weight of a triol or higher polyfunctional polyol or polyfunctional acid can be present to produce branching in the polyurethane polymer. Tetramethylene adipates having an average molecular weight from about 800 to about 2200 are preferred for the polyurethane overcoat.

Polyether polyols useful in preparing the polyurethanes of this invention can be prepared by polymerizing or copolymerizing alkylene oxides such as ethylene oxide, propylene oxide, and butylene oxides, by polymerizing or copolymerizing the low molecular weight glycols, or by the reaction of one or more such alkylene oxides with the glycols or with triol, or with a polycarboxylic acid such as phthalic acid. The polyether polyols include polyalkylene-aryl ether glycols or triols, polytetramethylene ether glycols, polyalkylene ether-thioetherglycols or triols and alkyd resins. Generally the polyether polyols are preferred for rigid foams including the sucrose and amine based ones prepared from propylene oxide and sucrose or an amine.

It is usually preferred that the hydroxyl-terminated unsaturated polymeric polyol has a molecular weight of from about 2000 to about 4000 and a corresponding hydroxyl number of from about 50 to about 25. The hydroxyl terminated unsaturated polymeric polyols used in this invention are unsaturated polymers of the type prepared by polymerizing unsaturated monomers comprising from about 70 to about 100 percent conjugated dienes selected from the group consisting of 1,3-butadiene and isoprene and up to about 30 percent styrene with the aid of organic peroxy catalysts to provide polymers which are generally terminated at both ends of their chain with hydroxyl groups and have a hydroxyl functionality of from about 2 to about 3 and usually from about 2.1 to about 2.8. The preferred hydroxyl containing polymeric polyols are polybutadiene polyols, polyisoprene polyols, butadiene-styrene copolymer polyols having about 80 to 90 percent units derived from butadiene and about 20 to 10 percent units derived from styrene and also butadiene-acrylonitrile copolymer polyols.

The organic polyisocyanates used in this invention include various organic diisocyanates and mixtures thereof. The organic polyisocyanates can be aromatic, aliphatic or cycloaliphatic or combinations of these types.

Representative examples of such polyisocyanates inclue the toluene diisocyanates, m-phenylene diisocyanate, 4-chloro-1,3-phenylene diisocyanate, 4,4'-tetramethylene diisocyanates, 1,6-hexamethylene diisocyanate, 1,10-decamethylene diisocyanate, 1,4-cyclohexylene diisocyanate, 4,4'-methylene-bis(cyclohexylisocyanate) and 1,5-tetrahydronaphthalene diisocyanate, and mixtures of such diisocyanates. The 4,4'-methylene bis(cyclohexylisocyanate) is preferred for the overcoat. Typically polyisocyanates with an NCO functionality of from 2 to 3 are preferred for rigid foams. Examples are triisocyanates prepared from toluene diisocyanate and trimethylol propane as well as polyisocyanates having an NCO functionality of about 2.5 to about 2.8 prepared by phosgenating an aldehyde amine product.

The curatives promote chain extension and crosslinking of the polyurethane polymer. Bifunctional materials, such as glycols and diamines having primary amino groups, are generally preferred as chain extending and crosslinking agents. Representative examples of such curatives are ethylene glycol, 1,3-propanediol, 1,4-butanediol, 1,5-pentanediol, 1,6-hexanediol and glycerol; aliphatic diamines, such as ethylene diamine, trimethylene diamine, 1,4 - cyclohexane bis(methylamine, [3,5,5 - trimethyl-3-aminomethyl cyclohexylamine], and tetramethylene diamine; aromatic diamines such as m-phenylene diamine, o- and m-dichlorobenzidine, 2,5-dichlorophenylene diamine, 3,3'-dichloro-4,4'-diamino-diphenyl methane, dianisidine, 4,4'-diamino-diphenyl methane, the naphthylene diamines, tolylene-2,4-diamine, p-aminobenzyl aniline, and o- and p-aminodiphenylamine; isophorone diamine; hydroxy amines such as triethanol amine, 2-amino-ethyl alcohol, 2-amino-1-naphthol and m-aminophenol; hydroxy carboxylic acids such as glycolic acid and alpha-hydroxy propionic acid; and amino carboxylic acids, such as amino acetic acid and amino benzoic acid. The preferred crosslinking agents are 1,4-butane diol, the chloroamines, such as orthodichlorobenzidine and methylene bis orthochloroaniline for the polyurethane foam substrate, the latter two chloroamines above are sometimes referred to herein for convenience as ODCB and MOCA respectively. Preferred aliphatic diamines are 1,4-cyclohexane bis (methylamine) and 3,5,5-trimethyl-3-aminomethyl cyclohexylamine. The latter diamines are sometimes referred to as CBMA and IPD. Isophorone is particularly preferred as a requirement for the polyurethane overcoat.

Various nonreactive solvents known to those skilled in the polyurethane art can be used for the preparation of the prepolymer solutions and polyurethane reaction mixtures, if a solvent is desired. Representative examples of the solvents are aromatic solvents, such as benzene, xylene and toluene; and the liquid lower ketones, such as acetone, methyl ethyl ketone, methyl isobutyl ketone and diisobutyl ketone and chlorinated solvents, such as the chlorosubstituted olefins, exemplary of which are dichloroethylene, trichloroethylene and 1,1,2,2-tetrachloroethylene as well as chlorosubstituted hydrocarbons exemplary of which are ethyl chloroform, dichloromethane, 1,2-dichloroethane, trichloroethane and 1,1,2,2-tetrachloroethane.

Various organic and inorganic coloring agents can be used to render the polyurethane overcoat opaque to the ultraviolet light, the selection and the amount of which are easily determined without undue experimentation by those having skill in the art. For example, representative pigments can be selected from carbon black, antimony oxide, titanium dioxide, zinc oxide, white lead and various other coloring pigments well known to those skilled in the art. The pigments can have a wide range of particle sizes, such as from about 0.1 to about 10 mils, usually from about 0.5 to about 5 mils. Typically, only a small amount of the pigment is needed, such as at least about 2 to about 10 parts by weight per hundred parts by weight of the polyurethane overcoat, although certainly larger amounts can be used.

Typically, very small amounts of a dye is necessary to impart color to the polyurethane overcoat. Usually from about 1 to about 5 parts by weight of the dye per hundred parts by weight of the polyurethane overcoat are suitable, although certainly large amounts can be used.

Dyes are classified in various ways. For example, one classification is based upon methods of application of dyes. According to this classification, dyes have been classified as acid dyes, basic dyes, direct or substantive cotton dyes, mordant dyes, vat dyes, ingrain dyes and sulfur dyes.

Dyes can also be classified according to their chemical constitution. For example, dyes have been classified as nitroso and nitro dyes, azo dyes, stilbene dyes, triphenyl- methane dyes, aurine phenolphthalein dyes, fluorescein dyes, rhodamine dyes, mauveine dyes, methylene blue dyes, indigoid dyes, Caledon jade green dyes, indanthrene blue dyes, sulfur dyes and cyanine dyes.

Typical epoxy resin compounds used in the polyurethane overcoat composition of this invention are well known to those skilled in the epoxy resin art. The general characteristic of this class of material is the presence of epoxy groups, which are of the formula:

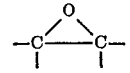

Ordinarily, epoxy resins contain a plurality of terminal epoxy groups. Usually epoxy resins are of moderately high molecular weight, containing more than 10, and usually more than 20 carbon atoms per molecule, although in this invention epoxy compounds containing fewer carbons may be used.

The epoxy group content of such resins is usually expressed as the epoxide equivalent, or grams of resin containing a gram equivalent of epoxide. The equivalent of a commercial resin is generally expressed as a range, such as 125–175, 150–200, etc. Epoxy resins having low epoxide equivalents, in the range of from about 125 to about 250, are usually preferred because of their lower viscosity, although higher equivalents, including 125 to about 525 with melting points up to about 75° C., offer advantages where viscosity is not a factor.

Epoxy resins are typically prepared by reaction of a polyfunctional epoxy compound with a compound containing two or more hydroxy radicals, producing epoxy resins comprising one or more ether linkages, joining organic radicals and terminating in epoxy groups.

The members of a preferred class of epoxy resins for use in the process of this invention are the products of reactions of polyfunctional epoxy compounds with aromatic polyhydric phenolic compounds. The polyfunctional epoxy compound used in this connection may be a diepoxide, distinguished from the class of epoxy resins by its relatively low molecular weight, illustrative of which are diepoxybutadiene and bis(2,3-epoxy-2-methylpropyl) ether. More usually, the polyfunctional epoxy compound is a haloepoxy compound, most commonly, epichlorohydrin. Reaction of epichlorhydrin, for example, with an aromatic polyhydric phenolic compound results in the formation of a polymer containing ether linkages between arylene radicals derived from the initial aromatic polyhydric compound and hydroxy-alkylene radicals derived from the initial haloepoxy compound, the polymers terminating in epoxyalkyl radicals. The aromatic polyhydric compound may comprise a monocyclic phenol, such as a resorcinol, a polycyclic phenol, such as p,p¹-(dihydroxy)-bisphenol, or phenolic resin, such as a phenol-formaldehyde resin. In particular, there are preferred in the process of this invention, epoxy resins derived from the reaction of epichlorohydrin and bisphenols. Illustrative of various suitable bisphenols are, for example, p,p¹-oxybisphenol,
p,p¹-methylene bisphenol,
2,2-bis(4-hydroxyphenyl)propane,
2,2-bis(4-hydroxy-2-methylphenyl)propane,
2,2-bis(2-t-butyl-4-hydroxyphenyl)propane,
2,2-bis(2,5-dimethyl-4-hydroxyphenyl)propane,
2,2-bis(2-chloro-4-hydroxyphenyl)propane,
2,2-bis(2-bromo-6-fluoro-4-hydroxyphenyl)propane,
1,1-bis(4-hydroxyphenyl)ethane,
1,1-bis(4-hydroxyphenyl)isobutane,
1,1-bis(2-isopropyl-4-hydroxyphenyl)isobutane,
2,2-bis(4-hydroxyphenyl)butane,
4,4-bis(4-hydroxyphenyl)heptane,
1,1-bis(4-hydroxyphenyl)dodecane and
2,2-bis(4-hydroxyphenyl)hexadecane.

Preferred resins for this invention are derived from epichlorhydrin and 2,2-bis(4-hydroxyphenyl)propane with an epoxide equivalency of about 150 to about 220, preferably about 175 to about 210. Resins which are pourable liquids at about 25° C. are preferred but others can be used in solution. Typical resins are those obtainable under the trade names Epon 828 and Epon 101 from the Shell Chemical Company.

Another class of epoxy resins commercially available and useful in the present process comprises aliphatic epoxy resins. Compounds of this nature may, for example, be prepared by a process analogous to that employed in preparing an epoxy resin from a bisphenol, with the substitution of an aliphatic polyol for the aromatic hydroxy compound. As illustrative of epoxy resins of this class may be mentioned reaction products of an epoxy group source such as epichlorohydrin with aliphatic polyols such as triethylene glycol, 1,4-butylene glycol, hexamethylene glycol, octaethylene glycol, glycerol, and sorbitol.

A specific class of epoxy resins useful in this invention are the allyl glycidyl ether polymers of varying molecular weights.

Epoxy groups can be introduced into organic molecules by treatment of an aliphatic double bond with an appropriate oxidizing agent. Examples of epoxy compounds of this nature are the epoxidized polydienes, such as epoxidized polybutadiene, epoxidized polyisoprene, epoxidized polypiperylene, epoxidized fats and oils, such as soybean oil, etc. The above epoxidized compounds can and frequently do contain more than two epoxy groups per molecule. For example, the number of epoxy groups can vary from a single epoxy group to 2 to 5 or even up to 10 or more per molecule.

Further illustrative examples of suitable epoxy resins and methods of preparation may be found in U.S. Pat. 3,350,406.

In the description of this invention, various epoxy resins are described as suitable for use with the various polyurethane reaction mixtures described in this specification and are suitable for use with the reaction mixtures specifically shown in the examples. Although it is usually preferable the epoxy resins are liquid and pourable at about 25° C. to 30° C., it is typically desirable to use solid epoxy resins in the preparation of polyurethane overcoats which come in contact with liquid hydrocarbons.

The practice of this invention is further illustrated by reference to the following examples which are intended to be representative rather than restrictive of the scope of the invention. Unless otherwise indicated, all parts and percentages are by weight.

EXAMPLE I

A polyurethane prepolymer was prepared by reacting 50 parts tetramethylene adipate having a molecular weight of about 1000 and 50 parts tetramethylene adipate having a molecular weight of about 2000 with about 40 parts of 4,4'-dicyclohexylmethane diisocyanate. The prepolymer was diluted with toluene to a 2.2 percent NCO content.

To 100 parts of the diluted prepolymer was mixed 2 parts of liquid Epon Resin 828 and 20.5 parts of a curative mixture at about 25° C. to form a polyurethane reaction mixture. The curative mixture was prepared by mixing 100 parts isophorone diamine with 400 parts methyl isobutyl ketone and aging for 10 days at about 25° C.

Films of the reaction mixture were drawn on polyethylene slabs and allowed to cure at about 25° C. for about 24 hours to form cured polyurethane films. Similarly, relatively clear films were also prepared without the addition of the epoxy resin.

The prepared cured polyurethane films were submitted to long term aging by immersion in water at 158° F. After 60 days, the film containing the epoxy resin still showed good rubbery properties while the film without the epoxy resin showed essentially no rubber properties as exhibited in Table 1. Thus, the film shows good resistance to moisture, particularly under heated conditions, such as those which can be encountered upon exposure to moisture and sunlight.

TABLE 1

| Original | Clear (without epoxy resin) | Epoxy resin |
|---|---|---|
| Tensile (p.s.i.) | 4,400 | 3,900 |
| Elong. (percent) | 480 | 460 |
| Thickness (inch) | 0.018 | 0.021 |
| After 60 days in water at 158° F. (measured wet): | | |
| Tensile (p.s.i.) | Deteriorated | 3,600 |
| Elong. (percent) | | 450 |

EXAMPLE II

A polyurethane prepolymer was prepared by reacting 1000 parts of tetramethylene adipate having a molecular weight of about 1000 and 530 parts of 4,4'-dicyclohexylmethane diisocyanate. The prepolymer was diluted with toluene to form a diluted prepolymer having a 2.6 percent NCO content.

To 100 parts of the diluted prepolymer was mixed (a) 10 parts of a white dispersion of titanium dioxide and Epon Resin 828 in a 60/40 weight ratio (White 2100), slurried in 10 parts of methyl ethyl ketone and (b) 23.6 parts of a curative mixture at about 25° C. to form a polyurethane reaction mixture. The curative mixture was prepared by mixing 100 parts of isophorone diamine and 400 parts of methyl isobutyl ketone and aging for about 48 hours at about 25° C.

Films were drawn of the reaction mixture on a polyethylene slab and allowed to cure at about 25° C. for about 24 hours to form white cured polyurethane films. Similarly clear cured polyurethane films were prepared without the titanium dioxide-epoxy resin dispersion.

The films were subjected to long term aging tests by immersion in water at 158° F. As shown in Table 2, the cured polyurethane containing the white-epoxy resin dispersion exhibited good retention of its physical properties. The clear film lost its rubbery properties in 60 days while the white film showed excellent rubbery properties even after 90 days.

TABLE 2

| Original | Clear (without epoxy resin) | White epoxy dispersion |
|---|---|---|
| Tensile (p.s.i.) | 5,300 | 4,800 |
| Elong. (percent) | 390 | 390 |
| Thickness (inch) | 0.017 | 0.019 |
| After 60 days in H₂O at 158° F.: | | |
| Tensile (p.s.i.) | 600 | 5,600 |
| Elong. (percent) | 90 | 460 |
| After 90 days in H₂O at 158° F.: | | |
| Tensile (p.s.i.) | (¹) | 5,500 |
| Elong. (percent) | | 400 |

¹ Zero tensile.

EXAMPLE III

A roofing composite structure was prepared by applying three successive spray coats of a portion of the polyurethane reaction mixture of Example I containing a small amount of leveling agent and a tan lacquer coloring agent to render the coats at least about 95 percent opaque to ultraviolet light in the 2000 to 3500 angstrom range over a rigid closed cell freshly cured polyether polyurethane foam roof structure. The coats were cured at about 30° C. for about 4 hours to provide an adherent protective overcoat having a thickness of about 15 mils.

The polyether polyurethane rigid and insulative roof structure was prepared by applying three coats of a liquid foamable polyurethane reaction mixture over a building form and allowing to foam and substantially dry and cure for about 4 hours at about 30° C. to form a closed cell rigid foam having a thickness of about 1 inch. The surface of the polyether polyurethane rigid foams typically appreciably deteriorate after about 24 hours exposure and particularly after about 3 days exposure to sunlight by first turning brownish in color and turning a darker brown and structurally weakening by becoming somewhat brittle after further exposure. The coaction of moisture and heat tends to hasten the deterioration.

The composite roof structure having the protective adherent opaque-epoxy containing polyurethane overcoat retained its structural strength without appreciable deterioration even after at least 30 days exposure of its surface to various combinations of moisture and sunlight.

Typical of the polyether polyurethane rigid foams suitable for roofing structures and those prepared by foaming and curing a mixture of a polyol and diamine with a polyisocyanate in a 1/1 volume ratio immediately before use. A representative formulation is shown in Table 3 where the polyol-diamine mixture under category A is mixed with the polyisocyanate of category B at about 25 to 50° C.

A

| Polyol-diamine mixture: | Parts by weight |
|---|---|
| Amine based polyether polyol having a viscosity of about 3200 centipoises at 25° C.[1] | 35 |
| Amine based polyether polyol having a viscosity of about 54,000 centipoises at 25° C.[1] | 25 |
| Sucrose based polyether polyol having a viscosity of about 100,000 centipoises at 25° C.[2] | 10 |
| Fire retardant of the phosphorous type | 30 |
| Triethylene diamine (catalyst) | 3 |
| Dibutyltin dilaurate (catalyst) | 0.5 |
| Trichloromonofluoromethane (blowing agent) | 60 |

B

Polymethylene polyphenyl isocyanate _____ [3]

[1] A polyether-tertiary amine type prepared from propylene oxide and an amine.
[2] A product of sucrose and propylene oxide.
[3] A polyisocyanate having an equivalent weight of about 132 and a weight percent NCO content of about 32 obtainable as Mondur MR from the Mobay Company.

While certain representative embodiments and details have been shown for the purpose of illustrating the invention, it will be apparent to those skilled in this art that various changes and modifications may be made therein without departing from the spirit or scope of the invention.

What is claimed is:

1. A composite structure comprising a rigid closed celled polyurethane foam substrate having an adherent essentially non-cellular protective polyurethane overcoat, said composite structure prepared by the method which comprises applying a liquid reaction mixture to a freshly prepared said foam substrate and curing to form said adherent overcoat, said reaction mixture comprising (A) an epoxy resin having an epoxide equivalent in the range of about 125 to about 525 derived from the reaction of epichlorohydrin and a bisphenol, (B) at least one curative selected from diamines having primary amino groups and from dihydroxyl terminated straight chain aliphatic hydrocarbon diols having from 2 to 6 carbon atoms, and (C) the product of an organic polyisocyanate and a reactive hydrogen containing polymeric material having a molecular weight in the range of from about 700 to about 5000, selected from hydroxyl terminated unsaturated polymeric polyols having a hydroxyl functionality of about 2.1 to about 2.8 and from polyester polyols and polyether polyols where the ratio of the isocyanato groups of the polyisocyanate to the reactive hydrogens of the reactive hydrogen-containing polymeric material is from about 1.1/1 to about 3.5/1, the ratio of amino groups and hydroxyl group of the curative to isocyanato groups in excess of the reactive hydrogens of the reactive hydrogen-containing polymeric material is from about 0.5/1 to about 1.1/1 and where the said polyurethane composition contains from about 1 to about 15 weight percent of the epoxy resin in a sufficient amount to give at least about 5 to about 50 equivalent percent excess of epoxide groups relative to the total excess of the said amino groups and hydroxyl groups of the curative over the said isocyanato groups.

2. The composite structure of claim 1 suitable as a roofing structure where the foam substrate is a rigid closed celled polyurethane supported by a building form and where the said overcoat has a thickness of at least about 5 mils and transmits less than about 10 percent of light having a wave length of from about 2000 to about 3500 Angstrom units.

3. The composite structure according to claim 2 where the said overcoat is prepared by the method which comprises reacting from about 1.5 to about 1.7 mols of an organic diisocyanate selected from at least one of the group consisting of toluene diisocyanate, 4,4'-diphenylmethane-diisocyanate and 4,4'-dicyclohexylmethane diisocyanate with a mixture comprising the epoxy resin, from about 0.4 to about 0.6 mol of a straight chain aliphatic hydrocarbon diol additive having from 2 to about 6 carbon atoms and having terminal hydroxyl groups, from about 0.03 to about 0.05 mole of a diamino diphenyl sulfone, and 1.0 mole of a polymeric polyester condensation reaction product of a dicarboxylic acid selected from adipic acid, azaleic acid and their anhydrides and a saturated hydrocarbon diol having terminal hydroxyl groups selected from diols having from two to six carbon atoms where the polyester has a molecular weight of from about 700 to about 2500 and an acid number of less than about 10, wherein the isocyanato groups of the diisocyanate are equal to from about 92 to about 97 percent of the total reactive hydrogens supplied by the polymeric polyester, the hydrocarbon diol additive, and the diamino diphenyl sulfone, and curing the reaction mixture.

4. The composite structure according to claim 3 where the foam substrate is a rigid polyether polyurethane foam and the epoxy containing polyurethane overcoat is prepared from an organic diisocyanate, the reactive hydrogen containing polymeric material, a diamino diphenyl sulfone selected from 4,4'-diamino diphenyl sulfone and 3,3'-diamino diphenyl sulfone, and the epoxy resin.

5. The composite structure of claim 2 where the polyisocyanate for the overcoat is an organic diisocyanate, the reactive hydrogen-containing polymeric material for the overcoat is selected from polyester polyols, polyether polyols, and hydroxyl terminated unsaturated polymeric polyols and the curative for the overcoat is at least one diamine.

6. The composite structure of claim 5 where the diisocyanate for the overcoat is selected from the toluene diisocyanates, m-phenylene diisocyanate, 4-chloro-1,3-phenylene diisocyanate, 4,4'-tetramethylene diisocyanate, 1,6-hexamethylene diisocyanate, 1,10-decamethylene diisocyanate, 1,4-cyclohexylene diisocyanate, 4,4'-methylene bis(cyclohexylisocyanate) and 1,5-tetrahydronaphthalene diisocyanate, and mixtures of such diisocyanates, the reactive hydrogen-containing polymeric material is selected from polyester polyols, polyether polyols and unsaturated hydroxyl terminated polymeric polyols selected from polybutadiene polyols, polyisoprene polyols, butadiene-styrene copolymer polyols, and butadiene-acrylonitrile copolymer polyols, the diamine is selected from ethylene diamine, trimethylene diamine, 1,4-cyclohexane bis(methylamine), and tetramethylene diamine; aromatic diamines such as m-phenylene diamine, o- and m- dichlorobenzidine, 2,5-dichlorophenylene diamine, 3,3' - dichloro - 4,4'-diaminodiphenyl methane, dianisidine, 4,4' - diamino - diphenyl methane, the naphthylene diamines, tolylene-2,4-diamine, p-aminobenzyl aniline, and o- and p-aminodiphenylamine and isophorone diamine, and where the epoxy resin is prepared from epichlorohydrin and 2,2-bis(4-hydroxyphenol) propane having an epoxide equivalency from about 150 to about 220.

7. The composite structure of claim 6 where the diisocyanate for the overcoat is 4,4'-methylene bis(cyclohexyl isocyanate), the reactive hydrogen containing material is a tetramethylene adipate, and the diamine is isophorone diamine.

References Cited

UNITED STATES PATENTS

| | | | |
|---|---|---|---|
| 3,547,753 | 12/1970 | Sutton | 161—190 X |
| 3,450,295 | 6/1969 | Weber | 117—161 KP X |
| 3,488,297 | 1/1970 | Aggias | 117—161 KP X |
| 3,493,631 | 2/1970 | Christenson et al. | 117—161 KP X |
| 3,494,888 | 2/1970 | McElroy | 117—161 KP X |
| 3,536,663 | 10/1970 | Oertel et al. | 117—161 KP X |
| 3,485,778 | 12/1969 | Oertel et al. | 117—138.8 D X |
| 3,499,783 | 3/1970 | Nelson et al. | 117—161 KP X |
| 3,455,076 | 7/1969 | Clarvoe | 161—159 X |

RALPH HUSACK, Primary Examiner

U.S. Cl. X.R.

117—72, 138.8 D, 161 KP, ZB